UNITED STATES PATENT OFFICE.

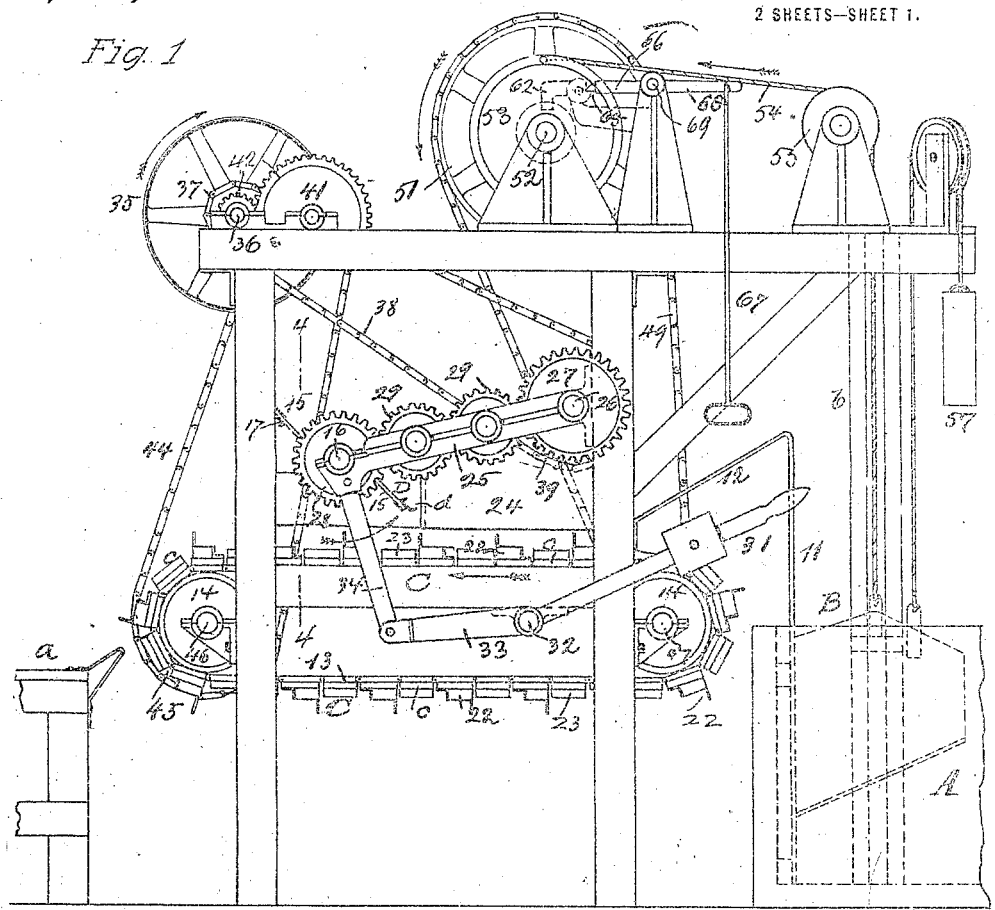
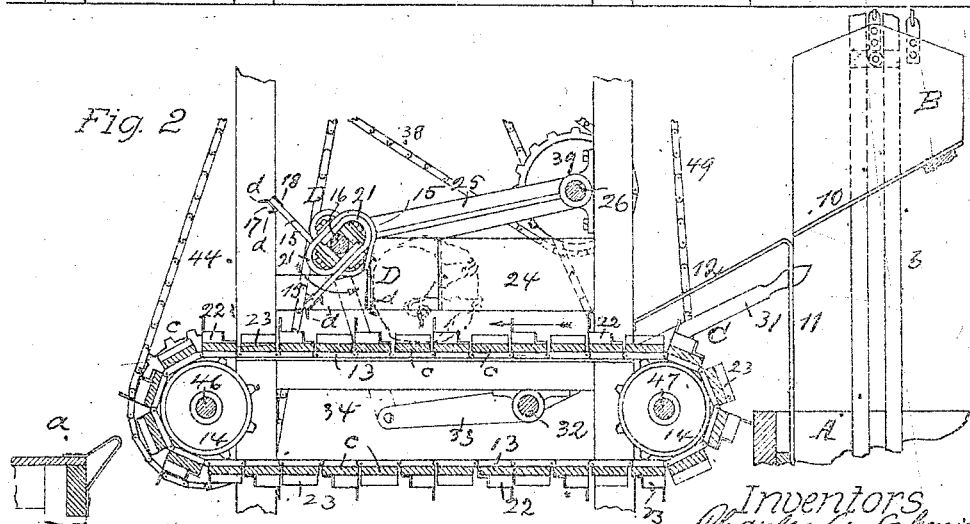

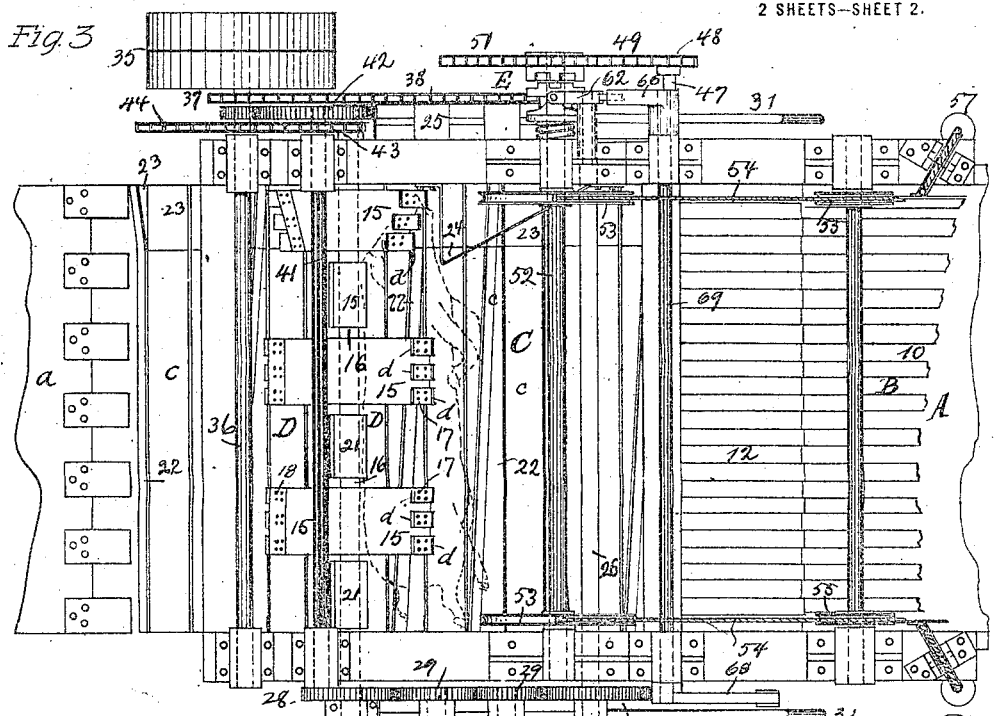

CHARLES G. SCHMIDT, CHARLES NAEGELEN, AND HENRY KORNMANN, OF CINCINNATI, OHIO, ASSIGNORS TO THE CINCINNATI BUTCHERS' SUPPLY COMPANY, OF CINCINNATI, OHIO, A CORPORATION OF OHIO.

HOG-SCRAPER.

1,293,211.     Specification of Letters Patent.     Patented Feb. 4, 1919.

Application filed September 2, 1913. Serial No. 787,600.

*To all whom it may concern:*

Be it known that we, CHARLES G. SCHMIDT, CHARLES NAEGELEN, and HENRY KORNMANN, citizens of the United States, and residents of Cincinnati, Hamilton county, State of Ohio, have invented jointly certain new and useful Improvements in Hog-Scrapers; and we do declare the following to be a clear, full, and exact description of the invention, attention being called to the two sheets of drawings which accompany this application and form a part thereof.

This invention concerns hog-scrapers which are devices serving to remove the hair from carcasses of hogs killed in slaughterhouses.

The operation is facilitated by previous immersion of the hogs after being killed, in a scalding vat.

The invention relates to that type of hog-scrapers in which the hair is removed by a true scraping action, in contradistinction to the pounding action of devices of the beater-type.

The invention consists of the construction of such an apparatus as hereinafter described and claimed and as illustrated in the accompanying two sheets of drawings, in which:

Figure 1, shows the device in side elevation.

Fig. 2, is a longitudinal section of the apparatus, taken in a vertical plane between the side frames thereof.

Fig. 3, is a top-view of the apparatus.

Fig. 4, shows parts of the apparatus in a vertical section taken on line 4—4 of Fig. 1.

Fig. 5, is an enlarged view of one of the scraping-devices.

Fig. 6, in a similar view, shows a modified construction of the same.

Fig. 7, is an enlarged portion of the top-view (Fig. 3), and illustrates a clutch device used in connection with the apparatus.

The apparatus comprises a scalding vat A into which the hogs, after being killed, are dropped to be immersed in hot water contained in said vat. In proper time the carcasses, one at a time, are floated over an elevator B, then in its lowered position, by which they are hoisted out of the vat and delivered upon a carrier C, whereby they are moved within the radius of action of a rotary scraping device D. The scraping device is so positioned as to prevent further advance of the carcass for the time being, the carcass however being continuously turned, due to the conjoint action of the moving carrier and of the rotating scraping device. In due time this latter is moved but without ceasing to rotate into a position permitting the carrier to move the carcass forward to a point of discharge. Another carcass is moved into place after the scraping device has been restored to its operative position.

The elevator B, moving between guides b is guided to move close to the side of the vat nearest the carrier and its bottom 10, which consists of open-frame work or bars to permit draining, is inclined toward said side of the vat to hold the carcass in position.

In alinement with this side of the vat are upright bars 11, forming guards or a retaining wall or means extending up and down to retain the carcass on the elevator while being lifted. At the upper end of these guards are bars 12 inclined toward the carrier C, so as to form a chute upon which, when the elevator is in alinement with them, the carcasses slide to the carrier.

The chute is inclined downwardly toward the vertical plane in which the carcass-support coacting with the scraping device is located. The bottom or carcass-support of the elevator is inclined in the same general direction as the chute, and, when in up-position, forms an extension of the chute, the retaining means extending up and down between the carcass-support of the elevator and the charging end of the chute. The carcass-support of the elevator and the said retaining means are so co-arranged that the carcass may be floated on the elevator and the elevator raised while maintaining its carcass-support in fixed inclination, the carcass being supported between the said carcass-support of the elevator and said retaining means during said elevation of the carcass, the carcass automatically moving off the carcass-support of the elevator onto the chute by gravity, and thence into the field of operation on the carcass, making a device of few parts, easily operated and not liable to get out of order, and requiring little power to operate.

The carrier consists of bars $c$ of suitable material, transversely carried upon chains 13 and secured at their ends to said chains.

The chains are supported upon pairs of chain wheels 14, serving as supports and guides, one set of the chain-wheels being power driven to move the carrier. The upper branch of the carrier is supported by suitable means against sagging.

The scraping device consists of short arms 15 of flexible material which are mounted upon a single shaft 16, and provided with scraping edges $d$. By preference parallel scraping edges are used which are formed by the parallel edges of a plate 17, bent up as shown. Between these edges the plates are rigidly connected to the ends of arms 15, preferably by rivets, which are seated against a reinforcing plate 18, on the other side of the arm. The connection to the shaft is by bolts 19, each bolt serving to connect two oppositely extending arms. In making this connection each arm is attached at two places by being bent around the shaft and connected thereto at two diametrically opposite points. The bend around the shaft is not close thereto, but is made so as to form a loop 21, whereby the loop of one arm serves as a cushion to back the other arm to prevent a short and destructive bend of that arm while in action, said cushion favoring also the return of the arms to normal position after each action against the carcass. The extent to which each arm may bend back during action is furthermore positively limited by the contact of plate 18 with a stop 20, the projection of loops 21 and length of arms 15 being arranged accordingly. The cushion-forming loops may also be formed independently as shown in Fig. 6.

There are sufficient of these scraping edges to cover the width of the arms 15, and there may be as many of these arms side by side on shaft 16, as are necessary to cover the length of a carcass while it rests transversely across the carrier. In its normal position, shaft 16 is so spaced from the carrier as to prevent passage of a carcass while being moved toward the scrapers, and to cause these latter to drag past the carcass with a protracted contact therewith. In view of the low position of this shaft, the length of arms 15 is limited to prevent striking the carrier.

In the present exemplification, the carrier is formed as an endless carrier, the upper stretch whereof forms the carcass-support complemental to the scraping device. The upper or supporting stretch of the carrier moves in the direction of the arrow shown in conjunction therewith in Figs. 1 and 2, while the scraping device, in the carcass-contacting portions of its path, moves in the opposite direction, as indicated by the curved arrows in said figures. The carcass, therefore, has a continuous movement imparted thereto by the supporting stretch of the continuous carrier toward the scraping device, the parts being so arranged that the line of force of the center of gravity of the carcass is substantially perpendicular to the plane of said supporting stretch and tends to maintain the relation between the carcass and said supporting stretch, whereas the action of the scraping device located thereabove is to roll the carcass along this supporting stretch toward the direction from which the supporting stretch is received, the parts acting combinedly to maintain the carcass-position on the supporting stretch closely adjacent to and in advance of the axis of rotation of said scraping device, solely by the coaction between said supporting stretch of the carrier and said rotary scraping device located thereabove. The axes of rotation of the scraping device and of the carcass are substantially parallel, while the supporting stretch of the carrier moves in a direction at substantial right angles to said axes.

The rotation of the carcass is assisted by upwardly projecting blades 22, carried by the carrier bars $c$. The scraping of the heads presents difficulties because they are smaller than the bodies of the carcasses and also present less resistance so that they are not as readily reached and acted upon by the scrapers.

This impediment is overcome by raising the heads and by holding them to the action of the scrapers. This is done by increasing the thickness of the carrier-bars $c$ at one end as shown at 23.

There is also a brace 24, shaped as shown, to permit the heads to clear it readily as they pass by. After they have passed, this brace backs up the heads and prevents them from being thrown back by the scrapers. The ends of those scraper-arms which operate opposite the heads terminate obliquely and the scrapers carried thereon are positioned accordingly.

The retention of the head in this position is favored by carrying the carcass in a position whereby the body is in advance of the head. This is accomplished by positioning blades 22 on bars $c$, so as to be inclined to the direction in which the carrier moves, as clearly shown in top view, Fig. 3.

The carcass is subjected to this scraping action as long as necessary to accomplish the desired purpose after which the scraping device is sufficiently raised to release the carcass and to permit it to be carried forward by the carrier to be finally discharged thereby and delivered upon the gambrelling table $a$.

For such purpose the scraping device is supported to permit such lifting, the means used for the purpose being preferably so arranged as to adapt themselves to and fit in properly with the arrangement of the means whereby the scraping device is rotated.

The means to permit such elevation consist of a pair of links 25 which at one of their ends swing on pivots and at their other ends carry the bearings for shaft 16 which actuates the scraping-device. These pivots are formed by the opposite ends of a shaft 26 which finds its support in bearings provided in the frame-work of the apparatus. This shaft serves also to actuate scraper-shaft 16, the transmission of the action being made by suitable machine elements.

A train of gear-wheels is used as shown, 27 being the gear-wheel on shaft 26 and 28 being the gear-wheel on shaft 16. The gap is bridged by intermediate gears 29, supported on one of the links of the pair.

As before described, the scraping device is supported above the carrier in a certain normally lowest position which support is obtained by supporting the free end of the links accordingly, said means serving also for the purpose of raising the scraping-device when a carcass is to be released as before described.

For such purpose we provide a hand-lever 31 pivoted to a rock-shaft 32 and extending within convenient reach of the operator.

This rock-shaft extends to the other side and arms 33 are also rigidly connected to this rock-shaft, one at each end thereof and one of which may simply be a continuation of the hand-lever or of both hand-levers in case there is one provided on each side.

Links 34 at the free ends of these arms connect them to the ends of scraper-shaft 16 or to links 25.

Power is supplied to a driving pulley 35, mounted on a shaft 36 and transmitted by it to the various parts to be operated, in any approved manner. A chain-wheel 37 on shaft 36 operates by means of a chain 38, another chain-wheel 39 on shaft 26. A shaft 41 is rotated by a pair of gear-wheels 42 and rotates a chain-wheel 43, which, by means of a chain 44, rotates a chain-wheel 45, to operate carrier C, this chain-wheel being mounted on shaft 46, which is one of the shafts supporting one of the sets of the carrier-pulleys.

The other one of these shafts designated at 47 carries a chain-wheel 48 which, by means of a chain 49 rotates a chain-wheel 51, to actuate the elevator operating shaft 52. Two sheaves 53 are mounted upon this elevator shaft and ropes or cables 54, one connected to each sheave, extend therefrom over guide-pulleys 55 and are connected to the elevator.

Chain-wheel 51 is mounted loosely and rotates the elevator shaft and the sheaves thereon only when the elevator is to be raised. Operative connection for the purpose between the driven chain-wheel 51 and the elevator-shaft is made by a suitable clutch E, controlled at will by the operator. After this connection is made, the elevator-ropes are caused to wind upon the sheaves until the elevator is raised to proper height, that is, even with inclined bars 12, to permit the carcass to slide off as before described.

The clutch is so arranged that at that moment the connection between the driven chain-wheel 51, and the elevator shaft is automatically broken, causing rotation of the sheaves to cease. The elevator is now free to descend which it does by its own weight, the elevator-ropes unwinding from the sheaves. Weights 57, may be provided to balance the elevator so as to modify the speed of this drop.

The diameter of the sheave-wheels is of such a size that one rotation winds up sufficient rope to raise the elevator to the particular height stated after which the sheaves are permitted to rotate in reverse direction, following the pull of the descending elevator while the ropes unwind. These effects are due to the construction of the clutch, shown in Fig. 7, and of the means for controlling it which are as follows: One of the complementary clutch parts shown at 58, is mounted to rotate with the loose power-driven chain-wheel 51. The other part consists of the clutch hub 59, slidably mounted upon the elevator shaft. 60 is a short spline or key also seated on the elevator shaft and between the two clutch-parts.

A spring 61, has a normal tendency to move the clutch-hub into engagement with part 58 and with spline 60, but is restrained by a latch 62, occupying a cam-groove 63, formed by a ring 64, mounted on the clutch-hub and forming a part thereof.

If the latch is raised out of the cam-groove, the clutch-hub becomes free to follow the action of the spring and is moved into engagement with the live clutch-part 58 from which it derives motion. It also engages key 60 on the shaft and thereby transmits the derived motion to said shaft which is now caused to rotate for the purpose of raising the elevator. The latch is operated by a trigger 65, carried at the end of an operating arm 66. Manipulation is by a rod 67 connected to another arm 68. Both arms 66 and 68 are mounted upon a rock-shaft 69. When clutch-hub 59 is shifted back again by the released latch, it loses connection with the live clutch part 58 and also with key 60 so that shaft 52 becomes free to revolve in opposite direction to permit unwinding of the elevator ropes.

It will be observed that in this apparatus, the scraping edges move over the skin with a protracted contact and remove the hair with a true scraping action which in its effect does not extend below the skin, in contradistinction to the pounding action of devices of the beater type, which rely for removal of the hair upon the limited contact by a blow from a long beater arm, largely sustained by the effects of centrifugal force. This action is considered objectionable inasmuch as it has a tendency to break up the meat fibers, separates the lean from the fat and renders the meat soft and mushy by mashing and breaking down its cells.

It is obvious that changes in structures may be made in our improved device, within the scope of the appended claims, without departing from the spirit of our invention.

Having described our invention, we claim as new:

1. In a carcass dehairing machine, the combination of an endless carrier having an upper substantially horizontal carcass-supporting stretch, and a rotary dehairing device having an axis of rotation located above said carcass-supporting stretch intermediate of the ends thereof, said dehairing device provided with dehairing means, said carcass-supporting stretch and said dehairing means in the carcass-contacting portions of the paths thereof moving in opposite directions, and said carrier provided with means acting in conjunction with said dehairing device for rolling the carcass on said carcass-supporting stretch in the field of action of said dehairing device.

2. In a carcass dehairing machine, the combination of an endless carrier having an upper substantially horizontal carcass-supporting stretch, a rotary dehairing device having an axis of rotation located above said carcass-supporting stretch intermediate of the ends thereof, said dehairing device provided with dehairing means, said carcass-supporting stretch and said dehairing means in the carcass-contacting portions of the paths thereof moving in opposite directions, said carrier provided with means acting in conjunction with said dehairing device for rolling the carcass on said carcass-supporting stretch in the field of action of said dehairing device, and means whereby to cause separation between said rotary dehairing device and said endless carrier for feeding the carcass past said dehairing device.

3. In a carcass dehairing machine, the combination of an endless carrier having an upper substantially horizontal carcass-supporting stretch, and a rotary dehairing device having an axis of rotation located above said carcass-supporting stretch intermediate of the ends thereof, said dehairing device provided with dehairing means, said carcass-supporting stretch and said dehairing means in the carcass contacting portions of the paths thereof moving in opposite directions, and said carrier provided with means having carcass-contacting edges arranged obliquely crosswise of the path of movement thereof for rotating the carcass in conjunction with said rotary dehairing device.

4. In a hog-scraping-apparatus, the combination of scraping-means, a carrier whereby a carcass is moved within action of said scraping-means, a frame upon which these parts are mounted, a scalding vat positioned adjacent this frame and below the carrier, a vertically moving elevator adapted to raise the carcasses from the vat and to deliver them to the carrier and means for causing this elevator to operate intermittently.

5. In a hog-scraping-apparatus, the combination of a rotary scraping-device, a carrier positioned to travel in a permanently fixed path below said scraping-device and whereby a carcass is moved within action of said device, said carrier comprising transversely arranged bars upon which the carcass rests while being moved forward, and means provided on these bars tending to hold the carcass against the action of the scraping-device.

6. In a hog-scraping-apparatus, the combination of a rotary scraping-device, a carrier which travels in a permanently fixed path and whereby a carcass is moved within action of this scraping-device, said carrier consisting of transversely arranged bars upon which the carcass rests while being moved forward, and blades provided on these bars tending to hold the carcass against the action of the scraping-device.

7. In a hog-scraping-apparatus, the combination of a rotary scraping-device and a carrier consisting of transversely arranged bars upon which the carcass is moved within action of the scraping-device and while being supported lengthwise across said carrier, the thickness of said bars at one end being increased to elevate the head of the carcass with reference to the scraping-device.

8. In a hog-scraping-apparatus, the combination of a rotary scraping-device, a carrier whereby a carcass is moved within action of the scraping-device while resting lengthwise across the carrier, and bracing means provided above the latter to maintain the head of the carcass in position against the action of the scraping-device.

9. In a hog-scraping-apparatus, the combination of a carrier adapted to support a carcass while resting lengthwise across the same, a rotary shaft mounted above this carrier, scraper-arms secured side by side to this shaft, and scraping-edges provided on these arms, the ends of the arms which operate opposite the head of the carcass being shaped obliquely.

10. A rotary scraping-device comprising a shaft, scraper-arms of flexible material positioned on opposite sides of said shaft and projecting in opposite directions therefrom, cushioning loops of similar material also projecting in opposite directions from said shaft, one back of each scraper-arm to limit the rearward bending of the same and bolts extending through the material of said scraper-arm and of said loops and serving for connecting both to the shaft.

11. In a hog-scraper, a scraping-device consisting of a rotary shaft, yielding scraper-arms provided with scraping-edges and bolts whereby they are connected to said shaft, the ends of said bolts forming stops to limit the flexing of the arms during action.

12. In a hog-scraper, a scraping-device consisting of a rotary shaft, yielding arms, bolts whereby they are connected to said shaft, plates forming scraping edges secured to one side of these arms and reinforcing plates opposite these plates on the other side of the arms and secured to the plates first mentioned with the arms between them, the flexing of the arms being positively limited by contact between said reinforcing plates and the ends of the bolts.

13. In a hog-scraping-apparatus, the combination of a rotary scraping device, a carrier traveling in a fixed path for moving a carcass within action of this scraping-device and consisting of transversely arranged bars upon which the carcass rests while being moved thereby, a device for supporting the head of the carcass while the same is subjected to the action of the scraping device and blades projecting from the bars of the carrier and positioned so as to be inclined to the direction in which this latter travels and whereby the carcass is carried in a manner tending to move the head thereof toward said support for it.

In testimony whereof, we hereunto affix our signatures in the presence of two witnesses.

CHARLES G. SCHMIDT.
CHARLES NAEGELEN.
HENRY KORNMANN.

Witnesses:
C. SPENGEL,
A. JOHNSON.